United States Patent
Paparizos et al.

(10) Patent No.: US 8,732,171 B2
(45) Date of Patent: May 20, 2014

(54) PROVIDING QUERY SUGGESTIONS

(75) Inventors: Stelios Paparizos, Mountain View, CA (US); Chris Anderson, Redmond, WA (US); Janine Crumb, Redmond, WA (US); James Gemmell, Danville, CA (US); Ajay Nair, Kirkland, WA (US); Gennadii Tertychnyi, Issaquah, WA (US); An Yan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 12/695,758

(22) Filed: Jan. 28, 2010

(65) Prior Publication Data

US 2011/0184951 A1  Jul. 28, 2011

(51) Int. Cl.
*G06F 17/30* (2006.01)
(52) U.S. Cl.
USPC ........... 707/737; 707/748; 707/752; 707/755; 707/767; 707/768
(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 6,493,702 B1 * | 12/2002 | Adar et al. | ..................... | 707/706 |
| 6,564,213 B1 * | 5/2003 | Ortega et al. | ........................... | 1/1 |
| 6,611,881 B1 * | 8/2003 | Gottfurcht et al. | ............. | 710/18 |
| 6,772,150 B1 | 8/2004 | Whitman et al. | | |
| 7,031,961 B2 * | 4/2006 | Pitkow et al. | ......................... | 1/1 |
| 7,630,986 B1 * | 12/2009 | Herz et al. | ............................. | 1/1 |
| 7,725,422 B2 * | 5/2010 | Ryan et al. | ............................. | 1/1 |
| 7,844,668 B2 * | 11/2010 | Canning et al. | ............... | 709/206 |
| 7,970,720 B1 * | 6/2011 | Heidenreich et al. | .......... | 706/45 |
| 8,032,470 B1 * | 10/2011 | Heidenreich et al. | .......... | 706/45 |
| 8,078,607 B2 * | 12/2011 | Oztekin et al. | ................ | 707/708 |
| 8,166,026 B1 * | 4/2012 | Sadler | ........................... | 707/725 |
| 8,166,029 B2 * | 4/2012 | Park et al. | ..................... | 707/732 |
| 2002/0016786 A1 * | 2/2002 | Pitkow et al. | ..................... | 707/3 |
| 2002/0042793 A1 * | 4/2002 | Choi | ............................... | 707/6 |
| 2003/0126108 A1 * | 7/2003 | Martino et al. | .................... | 707/1 |
| 2005/0125390 A1 | 6/2005 | Hurst-Hiller et al. | | |
| 2006/0026147 A1 * | 2/2006 | Cone et al. | ......................... | 707/3 |
| 2006/0036685 A1 * | 2/2006 | Canning et al. | ............... | 709/204 |
| 2006/0047725 A1 * | 3/2006 | Bramson | ....................... | 707/204 |
| 2006/0100956 A1 * | 5/2006 | Ryan et al. | ...................... | 705/37 |
| 2006/0195442 A1 | 8/2006 | Cone et al. | | |
| 2006/0259479 A1 | 11/2006 | Dai | | |

(Continued)

OTHER PUBLICATIONS

Carroll, Jeremy, et al., "Jena: Implementing the Semantic Web Recommendation," ACM, Proceedings of the 13th International WWW Conference on Alternate track papers & posters (WWW Alt '04), 2004, pp. 74-83.*

(Continued)

*Primary Examiner* — Farhan Syed
(74) *Attorney, Agent, or Firm* — Dave Ream; Peter Taylor; Micky Minhas (57) ABSTRACT

Methods and computer-readable media are provided for determining suggested queries. A user enters a search website, and the user is identified based on a user identification. Suggested queries are determined based on a group associated with the user. This association is created by extracting queries from data logs, categorizing the queries into groups based on their respective subject matter, associating the user with one or more groups, and determining suggested queries for each group. The suggested queries are communicated for display.

15 Claims, 6 Drawing Sheets

(56) References Cited

U.S. PATENT DOCUMENTS

| | | | |
|---|---|---|---|
| 2007/0192318 A1* | 8/2007 | Ramer et al. | 707/7 |
| 2008/0214148 A1* | 9/2008 | Ramer et al. | 455/414.1 |
| 2008/0243819 A1 | 10/2008 | Sareen et al. | |
| 2008/0256061 A1 | 10/2008 | Chang et al. | |
| 2009/0144262 A1 | 6/2009 | White et al. | |
| 2010/0094878 A1* | 4/2010 | Soroca et al. | 707/748 |
| 2011/0258049 A1* | 10/2011 | Ramer et al. | 705/14.66 |
| 2011/0313862 A1* | 12/2011 | Ramer et al. | 705/14.64 |
| 2012/0005009 A1* | 1/2012 | Ramer et al. | 705/14.46 |
| 2012/0005010 A1* | 1/2012 | Ramer et al. | 705/14.46 |
| 2012/0005011 A1* | 1/2012 | Ramer et al. | 705/14.46 |
| 2012/0005012 A1* | 1/2012 | Ramer et al. | 705/14.46 |
| 2012/0005013 A1* | 1/2012 | Ramer et al. | 705/14.46 |
| 2012/0005014 A1* | 1/2012 | Ramer et al. | 705/14.46 |
| 2012/0010949 A1* | 1/2012 | Ramer et al. | 705/14.46 |
| 2012/0010950 A1* | 1/2012 | Ramer et al. | 705/14.46 |
| 2012/0010951 A1* | 1/2012 | Ramer et al. | 705/14.46 |
| 2012/0010952 A1* | 1/2012 | Ramer et al. | 705/14.46 |
| 2012/0066057 A1* | 3/2012 | Ramer et al. | 705/14.46 |
| 2012/0066198 A1* | 3/2012 | Ramer et al. | 707/709 |
| 2012/0066199 A1* | 3/2012 | Ramer et al. | 707/709 |
| 2012/0173363 A1* | 7/2012 | Soroca et al. | 705/26.3 |
| 2012/0173364 A1* | 7/2012 | Soroca et al. | 705/26.3 |
| 2012/0173365 A1* | 7/2012 | Soroca et al. | 705/26.3 |
| 2012/0179564 A1* | 7/2012 | Soroca et al. | 705/26.3 |
| 2012/0179565 A1* | 7/2012 | Soroca et al. | 705/26.3 |
| 2012/0179566 A1* | 7/2012 | Soroca et al. | 705/26.3 |
| 2012/0179567 A1* | 7/2012 | Soroca et al. | 705/26.3 |
| 2012/0179568 A1* | 7/2012 | Soroca et al. | 705/26.3 |
| 2013/0080447 A1* | 3/2013 | Ramer et al. | 707/748 |

OTHER PUBLICATIONS

Shepitsen, Andriy, et al., "Personalized Recommendation in Social Tagging Systems using Hierarchical Clustering," ACM, RecSys '08, Oct. 23-25, 2008, pp. 259-266.*

Query Suggestion Strategies that Search Engines May Use—Published: Aug. 12, 2009 http://www.seobythesea.com/?p=2773.

* cited by examiner

PROVIDING QUERY SUGGESTIONS

BACKGROUND

Typically, queries that are suggested to a user are based on queries that have been submitted to a search engine in the past. These past queries may be found from various sources, including data logs, such as query logs, search logs, toolbar logs, etc. This method of suggesting queries, however, fails to target known interests of the user who is currently entering the query. Further, suggesting queries to a user in this way only provides for queries that have already been submitted to a search engine, as the queries are identified from data logs, and as such, severely limits the scope and subject matter of the suggested queries. Moreover, the suggested queries are determined based only on the query that is currently being entered and thus ignores many other factors that can be used to provide relevant query suggestions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to determining suggested queries. Suggested queries may be determined based on known interests of a user, or based on new functionality of a search engine. For instance, a user may be associated with a group based on queries that have been issued by that user in the past. Further, queries extracted from data logs are also associated with the group. In this way, queries that are associated with the group with which the user is also associated are suggested to the user regardless of the query currently being entered by the user. These suggested queries, in one embodiment, are not related in any way to the query that is currently being entered by the user, but the suggested queries represent areas of interest previously shown by the user. In another embodiment, queries are suggested based on structured expressions, which represent new functionality of a search engine. Structured expressions represent a plurality of queries that are derived based on one or more categories that comprise the structured expression. For instance, a user may begin entering a first portion of a query, and may then be presented with one or more words or phrases that include the same first portion of the query entered by the user. These suggested queries or portions of a query are derived from structured expressions. Further, the query suggestions may be dynamically determined as the query is being entered by the user, and as such, the query suggestions may change as the user types more alphanumeric characters into a search box.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for methods and computer-readable media for suggesting queries based on one or more factors, including new functionality of a search engine and areas of interest of the user. A user enters a search page, and based on factors such as past queries submitted by the user, website links selected by the user, and preferences associated with the user, the user is associated with a group. Suggested queries having similar subject matter are associated with the same group with which the user is also associated, therefore allowing for the identification of suggested queries. Moreover, queries may be suggested based on structured expressions, which represent new functionality of a search engine. These suggested queries may not have been submitted to a search engine before, and therefore are not included in any data logs. This allows search engines to define a query structure that provides the best and most relevant search results. Queries are derived from the structured expressions according to categories that comprise the structured expressions. In one embodiment, suggested queries are dynamically determined based on the portion of the query that a user has entered.

Accordingly, in one aspect, the present invention is directed to one or more computer-readable media storing computer-usable instructions that, when used by one or more computing devices, cause the one or more computing devices to perform a method. The method includes receiving an indication that a user has entered a website that allows for a search of a database based on an entered query, and identifying the user based on a user identification associated with the user. The method further includes determining suggested queries based on at least one of a plurality of groups with which the user is associated. The user is associated with the at least one group by extracting queries from data logs, categorizing each of the queries into the plurality of groups based on a subject matter of each of the queries, associating the user with the at least one of the plurality of groups based on one or more of past queries submitted by the user, website links selected by the user, or preferences associated with the user, and determining the suggested queries for each of the plurality of groups. Additionally, the method includes communicating for display the suggested queries.

In another aspect, the present invention is directed to one or more computer-readable media storing computer-usable instructions that, when used by one or more computing devices, cause the one or more computing devices to perform a method. The method includes receiving user input in a search box that includes at least a portion of a first alphanumeric string of a user-submitted query. Based on the user input, a database is accessed to determine suggested first alphanumeric strings. The database contains a plurality of alphanumeric strings that are each associated with at least one category based, in part, on a subject matter of each of the plurality of alphanumeric strings. The method also includes communicating for display the suggested first alphanumeric strings and receiving an indication of the first alphanumeric string of the user-submitted query. In one embodiment, the suggested first alphanumeric strings are dynamically determined as the user types the first portion of the query. Further, the method includes deriving suggested queries that include the first alphanumeric string of the user-submitted query. Each of the suggested queries is derived according to a structured expression, and wherein the structured expression comprises one or more categories such that one of the plurality of alphanumeric strings is selected from each of the one or more categories to form the suggested queries. The method additionally includes communicating for display the suggested queries. The suggested queries may be dynamically determined, and as such may vary as the user continues to enter alphanumeric characters of the query into a search box.

A further aspect is directed to one or more computer-readable media storing computer-usable instructions that, when used by one or more computing devices, cause the one or more computing devices to perform a method. The method includes receiving an indication that a user has entered at least a portion of a first alphanumeric string of a user-submitted query into a search box, and determining a group with which the user is associated. Also, the method includes communicating for display suggested first alphanumeric strings that are selected based on the group with which the user is associated and the at least the portion of the first alphanumeric string of the user-submitted query. The method additionally includes receiving user input indicating the first alphanumeric string of the user-submitted query and accessing a database to identify suggested queries that each contain the first alphanumeric string of the user-submitted query. Each of the suggested queries is structured according to a structured expression whose structure has been determined by the structure of the potential queries in the data logs. Further, the structure of the structured expression comprises one or more categories that are each associated with a plurality of alphanumeric strings such that one of the plurality of alphanumeric strings is selected from each of the one or more categories to form a member of the one or more suggested queries. Moreover, the method includes receiving the user input indicating the user-submitted query, and communicating for display a plurality of search results that are identified based on the user-submitted query.

Figure 1:
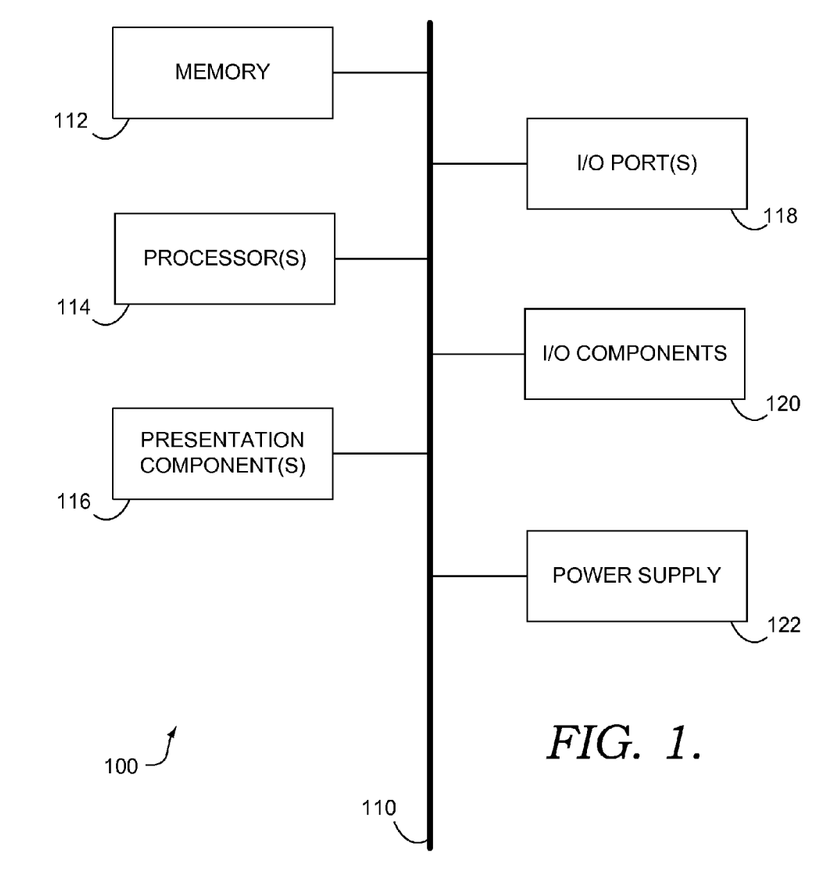
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," and the like, as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above are also included within the scope of computer-readable media.

The memory 112 includes computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

Figure 2:
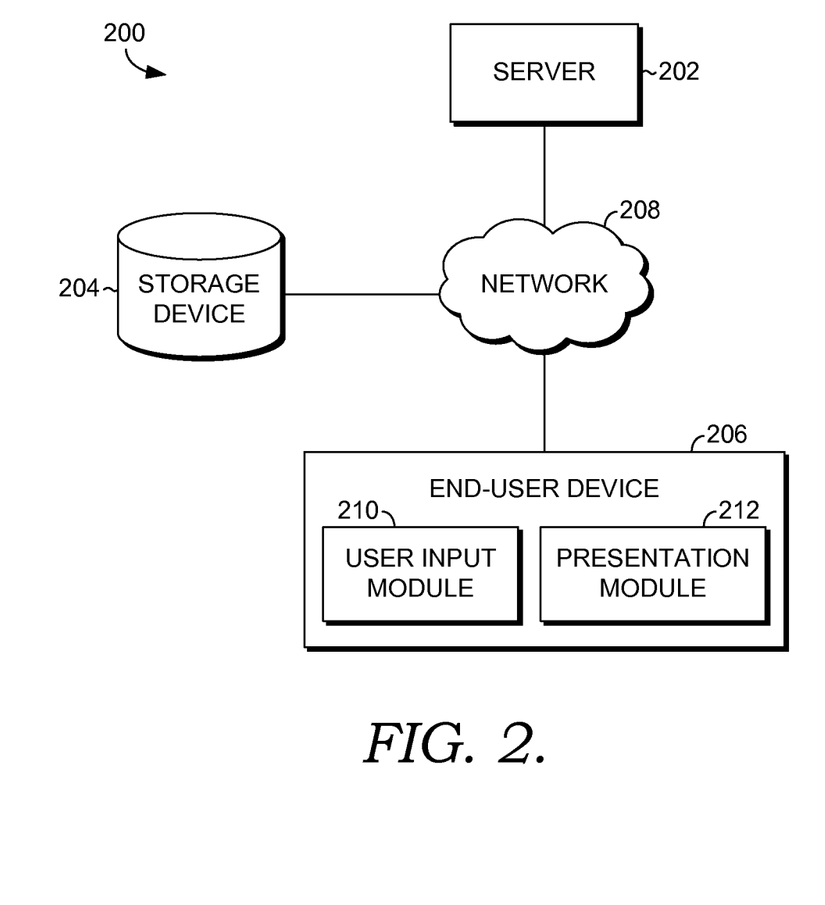
FIG. 2 is a block diagram of an exemplary computing system architecture configured for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, and an end-user device 206, all in communication with one another via a network 208. The network 208 may include, without limitation, one or more local area networks (LANs) and/or wide area networks (WANs). Such networking environments are commonplace in offices, enterprise-wide computer networks, intranets, and the Internet. Accordingly, the network 208 is not further described herein.

The storage device 204 is configured to store information associated with query suggestions. In various embodiments, such information may include, without limitation, data logs, user identifications, queries organized by group, alphanumeric substrings organized by category, structured expressions, and/or the like. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more data logs, user identifications, queries organized by group, alphanumeric substrings organized by category, structured expressions, and/or the like. The content and volume of such information are not intended to limit the scope of embodiments of the present invention in any way. Further, though illustrated as a single, independent component, the storage device 204 may, in fact, be a plurality of storage devices, for instance a database cluster, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft® Corporation headquartered in Redmond, Wash.

Components of server 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media, as described herein. It will be understood by those of ordinary skill in the art that computing system architecture 200 is merely exemplary. While the server 202 is illustrated as a single unit, one skilled in the art will appreciate that the server 202 is scalable. For example, the server 202 may in actuality include a plurality of servers in communication with one another. Moreover, the storage device 204 may be included within the server 202 or end-user device 206 as a computer-storage medium. The single unit depictions are meant for clarity, not to limit the scope of embodiments in any form.

As shown in FIG. 2, the end-user device 206 includes a user input module 210 and a presentation module 212. In some embodiments, one or both of the modules 210 and 212 may be implemented as stand-alone applications. In other embodiments, one or both of the modules 210 and 212 may be integrated directly into the operating system of the end-user device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input. Such input might include, for example, user search queries. Typically, input is entered via a user interface (not shown) associated with the end-user device 206, or the like. Upon receiving input, the presentation module 212 of the end-user device 206 is configured for presenting suggested queries, for example, in association with a search website. Embodiments are not intended to be limited to visual display but rather may also include audio presentation, combined audio/video presentation, and the like.

Figure 3:
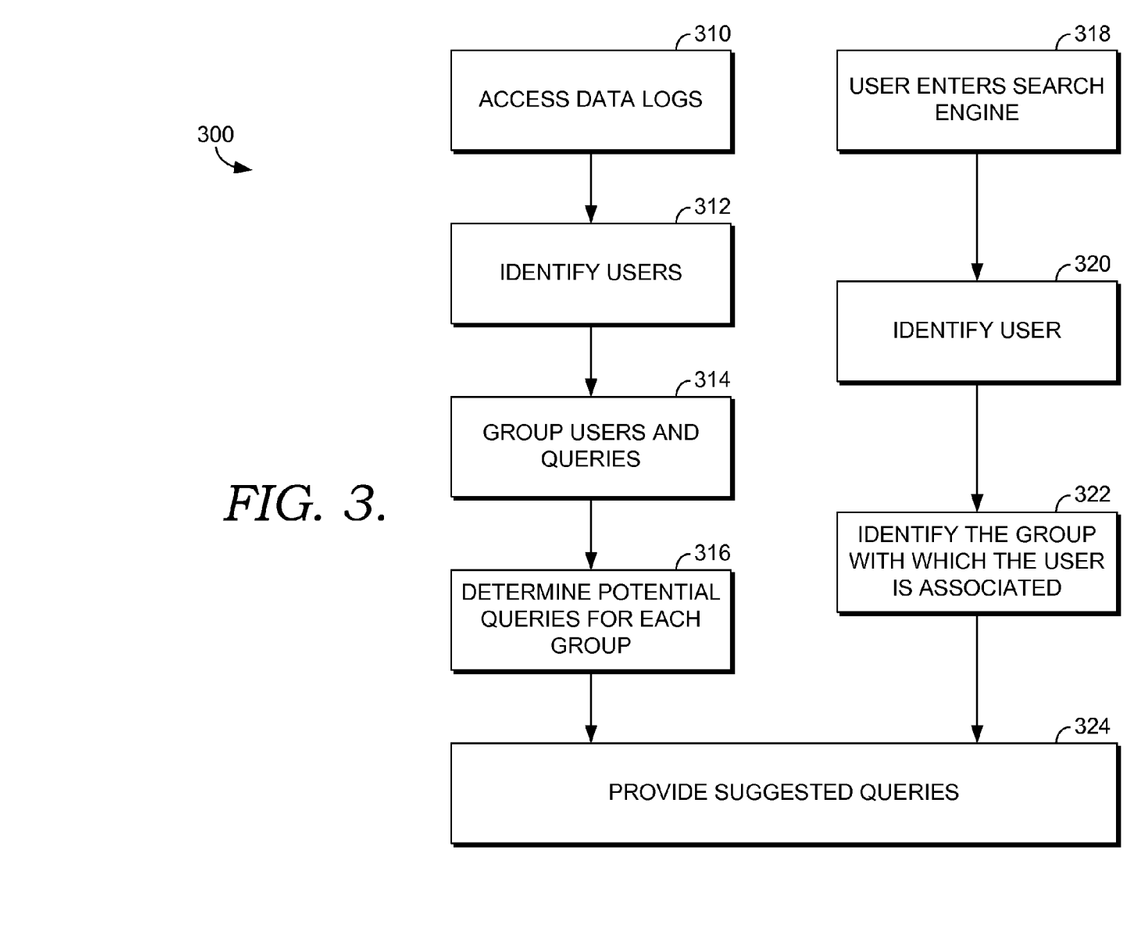
FIG. 3 is a flow diagram of a method for determining suggested queries based on a group associated with the user, in accordance with an embodiment of the present invention.

Turning now to FIG. 3, a flow diagram of a method 300 is illustrated for determining suggested queries based on a group associated with the user, in accordance with an embodiment of the present invention. Initially, one or more data logs are accessed at step 310. Data logs, as used herein, include one or more of web logs, query logs, toolbar logs, browser logs, and the like. Browser logs provide information on user activity that has taken place in the browser. Toolbar logs capture activity from the browser as well, but via the toolbar. This information is captured so that it can be used, for example, to provide functionality associated with embodiments of the present invention. Data logs contain a variety of information, including, but not limited to, user identifications, a list of queries that the users have submitted to a search engine, times and dates associated with each submitted query, etc.

Once the data logs are accessed, unique users listed in the data logs are identified at step 312. Users may be identified in a number of ways, such as by an Internet protocol (IP) address or a user identification (e.g., if the user was logged on to a website when the query was submitted). In one embodiment, one or more of the IP address or user identification indicates a physical location associated with the user, such as a city, zip code, state, etc. At step 314, users and queries are categorized into various groups. Queries are categorized into groups according to each query's subject matter. For example, two queries directed to cars may both be grouped into a car-lovers group.

Users are categorized into groups according to a number of factors, including one or more of the subject matter of previous queries submitted by the user, website links selected by the user, or user preferences. Other factors may also be considered in addition to those listed as examples above. For example, two users who both submit queries regarding a certain basketball team may both be associated with a basketball group, or even a sports group. Or, a user who has indicated an interest in cars in the user preferences, such as when the user signed up to be a member of a certain website, may be assigned to a car-lovers group. In yet another example, a user who has selected one or more links (e.g., search result links) related to animals as a result of a search may be assigned to an animal-lovers group. The animal-lovers group may contain a plurality of queries that have been previously submitted by a number of users and that are directed toward various animals. In one embodiment, a single user is associated with more than one group, as a user may have diverse interests as indicated by the user's previously submitted queries. In one embodiment, users are grouped based on their location. For instance, users who are associated with the city of Seattle may be associated with a Seattle group. A user's location may be determined, for instance, by the user's identification or some other unique identifier.

As users and queries are now categorized by group based on the subject matter of the queries in the data log and the other factors listed above, queries that will be suggested from each group may be determined, as shown at step 316. For example, potential queries to suggest to a user may be determined based on a popularity of the queries, how recently each query was submitted, trends for the particular group, or topics that are discussed or determined from the queries. In one embodiment, query popularity is determined by the number of instances that users have selected a particular query. In this embodiment, the greater the instances that a particular query has been selected, the more popular the query is considered to be. Once the potential queries are determined for each group, the queries may be stored in a searchable database or some other storage device. Moreover, potential queries determined for each group may change, and thus are dynamic, not static. The number of potential queries may vary, in addition to the actual queries that are determined to be the most popular, etc. Steps 310 through 316 outlined above may be performed offline, such as before a user enters a search engine and submits a query.

Steps 318 through 324 are considered to be online steps and are initiated by a user entering a search engine, as shown at step 318. In one embodiment, a user simply entering a search page or search website that allows for a search to be performed acts as a trigger to determine suggested queries. In another embodiment, however, the user begins to enter a query in a search box when suggested queries are determined. The user is identified at step 320 by, for example, an IP address or a user identification associated with the user. At step 322, a group is identified with which the user is associated. At step 314 as described above, the user is associated with one or more groups based on, in part, the subject matter of the queries submitted by the user. At step 322, a look-up may be performed, for instance, and the group(s) with which the user is associated is identified.

At step 324, suggested queries are provided to the user. In one embodiment, a selection of the potential queries that are determined for each group at step 316 are communicated for display, which may include being sent to a client device associated with the user. This client device may be the end-user device 206 in FIG. 2. In one embodiment, the top fifteen most popular queries for a particular group are suggested to a user who is associated with that group. In another instance, the top five most popular queries for a particular group are suggested to a user who is associated with that group. The number of queries that are suggested may vary and may be any number. The above examples are given for illustrative purposes and are not meant to limit the scope of embodiments of the present invention in any way.

As described, queries are suggested to a user based on one or more groups with which the user is associated. As such, the queries that are suggested to the user may or may not be related to the query that the user is currently entering or that the user plans on entering once the user has arrived at the search page. For example, a user may begin entering a query for "Britney Spears," but may receive query suggestions that are related to cars, as the user had previously submitted queries related to cars and thus has been assigned to a group that is intended for car lovers. Therefore, suggested queries may be popular queries associated with a particular group and are provided irrespective of what the user is typing at the moment.

Figure 4:
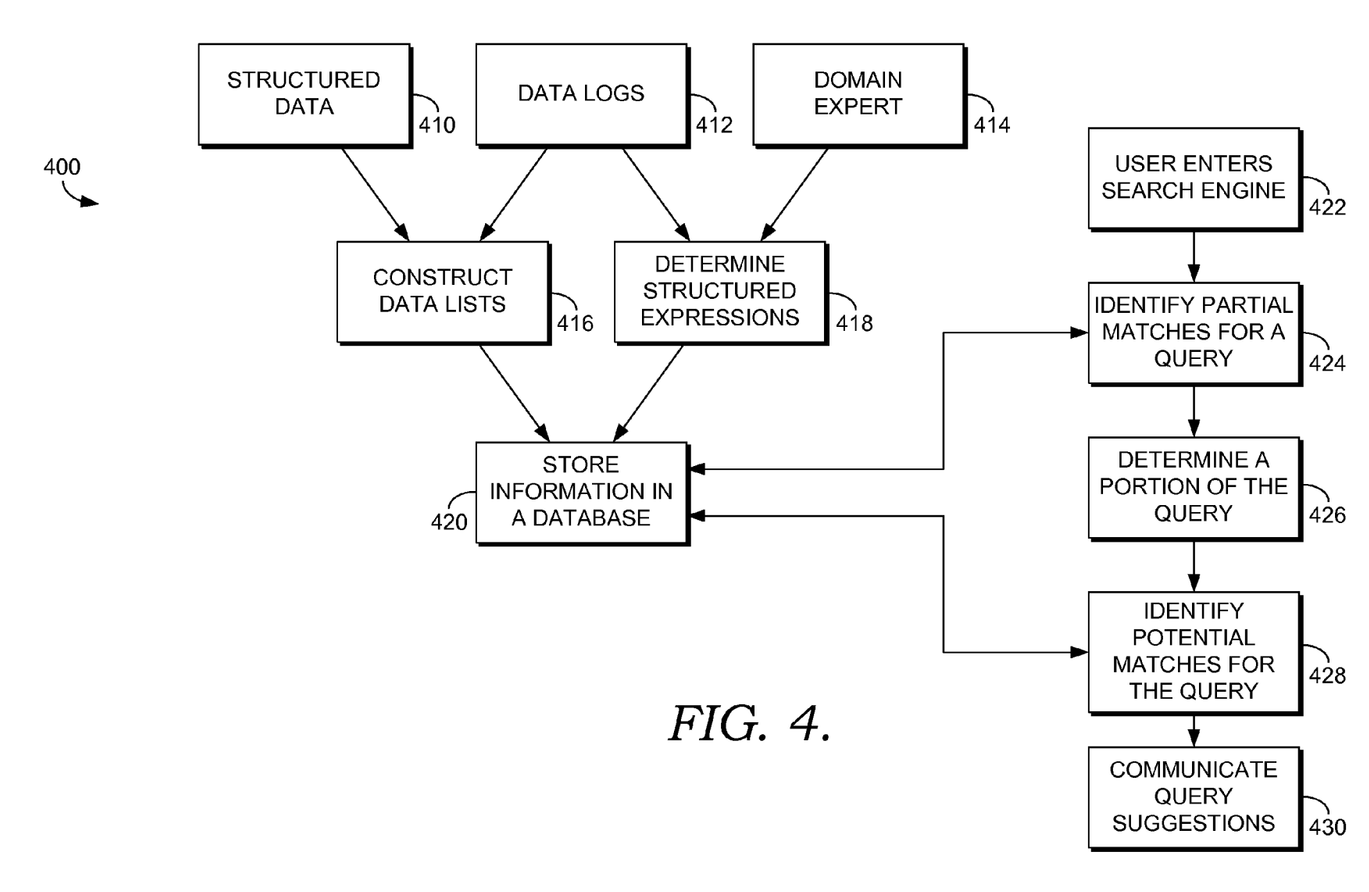
FIG. 4 is a block diagram of a method for determining suggested queries based on structured expressions, in accordance with an embodiment of the present invention.

FIG. 4 illustrates a flow diagram of a method 400 for determining suggested queries based on structured expressions, in accordance with an embodiment of the present invention. As used herein, a structured expression represents a plurality of queries that are formed according to the structured expression. The queries are broken up into individual alphanumeric strings, such as words, which are stored in a database according to a category that has been assigned to each of the words. For instance, the query "Toyota Corolla" contains two words, and each may be grouped according to a category to which each word belongs. "Toyota" may belong to a category of car brands, and "Corolla" may belong to a category of car models. An exemplary structured expression is {auto parts for <car-brand><car-model>}, which includes two categories, namely a car brand and a car model. Each structured expression represents one or more categories. A user may begin typing the phrase "auto parts," and as such a suggested query may include "auto parts for Toyota Corolla," for example.

The suggested queries are determined by considering one of a number of factors. Initially, structured data 410 and data logs 412 are considered. Words are extracted from these sources and are each grouped into one or more categories. Referring back to the example given above, a word "Toyota" extracted from a data log may be grouped in a car-brand category. Similarly, a word "Michigan" may be assigned to several categories, including, for instance, a college sports teams category and a location category. A similar process is followed for all other words extracted from the structured data and data logs. While the examples provided are single words, phrases that include more than one word may also be combined and grouped into a category. For instance, "Kansas Jayhawks" may be assigned to the college sports teams category, even though it contains more than one word. Once the words or phrases are extracted, data lists are constructed at step 416. The data lists contain lists of words that can be selected to be included in suggested queries. In one embodiment, words are sorted by category in the data lists.

One or more of the data logs 412 or a domain expert 414 are used to determine structured expressions, shown at step 418. As mentioned above, a structured expression represents a plurality of queries, and includes one or more categories from which words or phrases are selected. Queries that are suggested to a user in the embodiment of FIG. 4 are determined based on a structured expression. Structured queries that are determined from data logs 412 are determined, in one embodiment, based on the potential queries determined at step 316 in FIG. 3. As discussed with reference to FIG. 3, potential queries, in one embodiment, are those that have been determined to be more popular than other queries, such as those that have been submitted to a search engine more times than other less popular queries. These popular queries may be used to construct structured expressions so that the structured expressions represent queries that are most popular or that are of a higher relevancy than other queries. As an example, if a significant number of queries are structured as {<sport><sport team>}, a structured expression having this structure may be constructed. Therefore, trends in submitted queries are evaluated.

In another embodiment, structured expressions are determined by use of a domain expert 414 that determines structured expressions based on information, such as data logs, that is provided and may include rules for making this determination. In still another embodiment, structured expressions are manually entered into a system. Once data lists and structured expressions have been identified and determined, this information is stored in a database at step 420. This information may be stored in a fast structure, such as a trie table, hot table, binary tree, or other look-up structure. This storage structure allows for data to be extracted quickly so that suggested queries can be identified and returned to the user.

Continuing with FIG. 4, the online portion of this embodiment initiates with a user entering a search engine at step 422. In one embodiment, a user begins entering (e.g., typing) a query, such as a first word or phrase of a query. The search engine may include one or more of a website specifically directed toward searches, a search box on a toolbar or otherwise, or anywhere else where a user may submit a query for purposes of receiving search results. At step 424, partial matches to the first word or phrase of the query are identified. For instance, if a user begins to enter "Fo," this partial entry could map to many words, including, for instance, Ford, football, food, foliage, etc. In one embodiment, a certain number of words that match to the entered characters are displayed from which the user may select. The words that are displayed as suggested words may be selected from a database, such as the database described in relation to step 420, based on the user's interests, as determined by one or more groups with which the user is associated. The determination of the group(s) with which the user is associated is described in relation to step 314 of FIG. 3. In another embodiment, suggested words are identified based on their popularity. For instance, data logs 412 may be consulted to determine those words or phrases that are submitted the most by various users in a query. In still another embodiment, suggested words are selected based on both groups with which the user is associated and the popularity of these words.

At step 426, the portion of the query is determined. For instance, if "Ford," "football," and "food" are displayed as suggested words and the user selects "football," "football" is the portion of the query that is determined. The determination may be made by a user selecting that word, or if none of the suggested words are selected by the user, the user may finish typing that word or phrase, and then a determination can be made as to the portion of the query that the user is entering into a search box. It should be noted that the suggested words may be dynamically determined as the query is being entered by the user, and as such, the suggested words may change as the user types more alphanumeric characters into a search box. For instance, as "fo" could be "footall," or "food," "foot" would not be "food," and so "food" may be removed from the list of suggested words once "foot" has been entered.

Once a first portion of the query is known, potential matches for the rest of the query are identified at step 428. These potential queries are identified based on one or more structured expressions. For instance, if it is determined that a first portion of the query is "football," suggested queries may include "football Michigan," "football Florida," or "football Kansas," all of which may be derived from a structured expression of {<sport><college team>}. Another example, in response to a first portion of the query being "Ford," suggests queries including "Ford Focus," "Ford Explorer," and "Ford F150." These queries may be derived from a structured expression of {<car-brand><car-model>}, for example.

In one embodiment, queries derived from different structured expressions are simultaneously suggested to the user. For instance, the word "football" may provide for suggested queries including "football Michigan" and "football Manning," which may be derived from structured expressions {<sport><college team>} and {<sport><player>}, respectively. At step 430, the query suggestions determined from the structured expressions are communicated for display to an end-user device, such as end-user device 206 illustrated in FIG. 2.

In one embodiment, queries that are derived from structured expressions have never been submitted as a query before, and may represent new functionality of the search engine. For instance, the search engine may be more efficient at processing a query that is structured according to a structured expression than a query that is not structured according to a structured expression. Moreover, deriving structured expressions that have new functionality may allow users to learn the new functionality that is supported by the search engine so that the users may issue queries in the future having that same structure as the structured expressions.

Moreover, embodiments of the present invention may not implore each step as outlined above. For instance, a user who types "Fo" into a search box may be presented with suggested queries including "Ford Focus," "Football Michigan," and "Food recipes" without the steps of providing suggested first words. The search engine may skip those steps and simply provide suggested queries, such as the most popular queries, derived from structured expressions, such as the most popular structured expressions.

Figure 5:
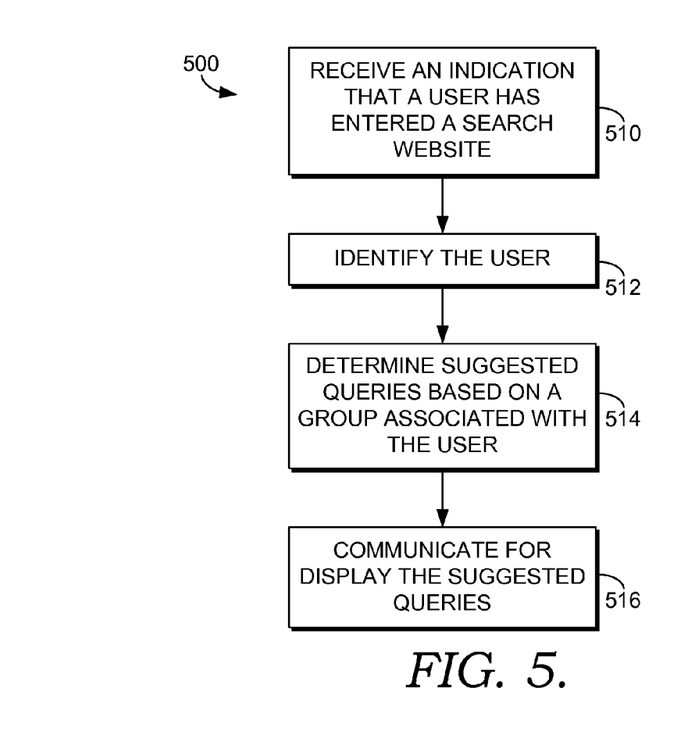
FIGS. 5-7 are flow diagrams of methods for determining suggested queries, in accordance with embodiments of the present invention.

Referring to FIG. 5, a flow diagram of a method 500 is shown for determining suggested queries, in accordance with an embodiment of the present invention. Initially, at step 510, an indication is received that a user has entered a search website. A search website may allow for a user to search a database for one or more search results based on an issued query. In one embodiment, the user has simply entered the search website, such as having entered a URL for a website. In another embodiment, the user has at least partially entered a query into a search box. Search websites may include, other than a website dedicated to searching or that allows searching, may also include a search box located in a browser, toolbar, etc. At step 512, the user is identified, such as by a user identification that has been associated with the user. User identifications may include IP addresses, or a unique alphanumeric string that identifies the user. The actual user, such as the name, may not be identified for privacy reasons, but an identification that distinguishes one user from another is used so that it is known that two different users are entering a particular query, for example.

One or more suggested queries are determined at step 514 based on one or more groups that are associated with the user. Groups, in one embodiment, are related to various user interests, including, but certainly not limited to, sports, food, cars, dating, children, colleges, etc. This list is provided for illustrative purposes only and is not exhaustive. The group(s) with which the user is associated is determined by first extracting queries from data logs, such as toolbar logs, query logs, browser logs, search logs, etc. Each of these queries is categorized into groups based on a subject matter of the queries.

A subject matter may be a particular interest of a user, such as those listed above. The user is then associated with one or more of the groups that have already been established. The queries have been categorized into groups, and as such, each group may be associated with both queries and users. The users are associated with one or more groups based on past queries submitted by the user (e.g., determined by the data logs), website links selected by the user, or preferences associated with the user.

Once the queries are associated with the groups, suggested queries are determined for each of the plurality of groups. The number of suggested queries determined for each group is typically less than the total number of queries associated with that group, as only a subset of the queries associated with the group may be selected as suggested queries. Further, as suggested queries are selected according to a group(s) with which the user is associated and not based on the query submitted by the user at the moment, a portion of the suggested queries presented to the user may not be related in any way to the query that the user is in the process of submitting, or has already submitted to the search engine. In that respect, the user may be submitting or may wish to submit a query of "Britney Spears," but may be presented with queries such as "chicken recipe" or "Tiger Woods" if the user is associated with a food-lovers group and a golf-lovers group, for example.

The suggested queries for each group may change based on a number of factors, such as information known about the user, recency considerations, etc. Recency considerations includes when queries were last submitted to the search engine. In some instances, more recently entered queries may be more relevant to users in the future. Moreover, the suggested queries may be determined based on popularity, such as the number of instances that a particular query has been entered in a search engine, which can be determined from data logs. Recent trends or topics associated with a particular group may also dictate which queries are suggested.

The one or more suggested queries are communicated for display at step 516. In one embodiment, the one or more suggested queries are communicated to an end-user device to be displayed for the user. After the suggested queries are communicated, a user selection of one of the suggested queries may be received and search results that are found to be relevant to the selected suggested query may be communicated for display. In the event that the user does not select one of the suggested search results, the user may submit a query into the search box and search results are displayed that are found to be relevant to the query.

Figure 6:
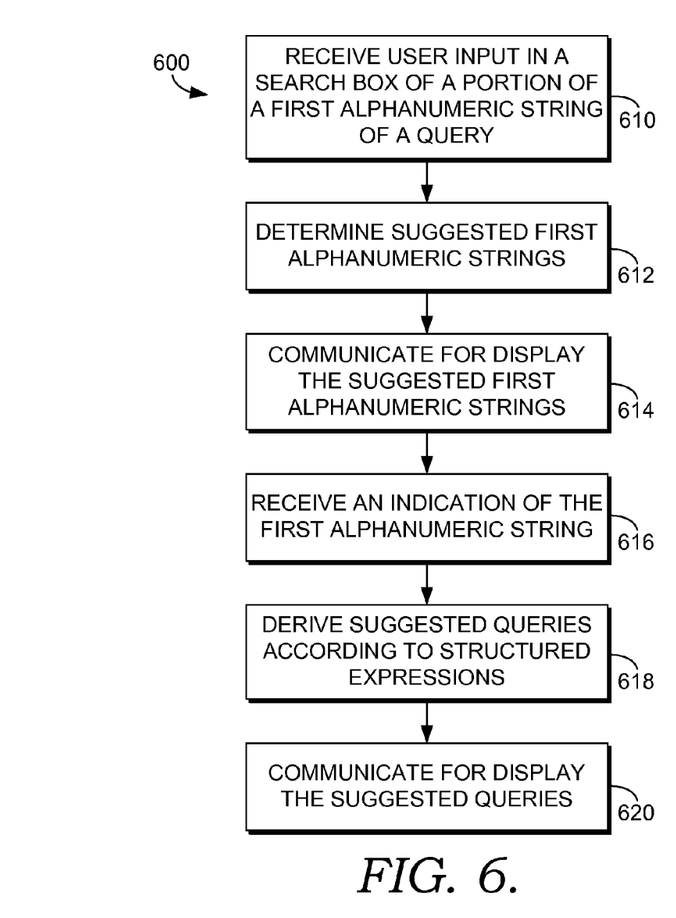

FIG. 6 is a flow diagram of a method 600 for determining suggested queries, in accordance with an embodiment of the present invention. Initially, at step 610, user input is received in a search box. The user input includes at least a portion of a first alphanumeric string of a user-submitted query. An alphanumeric string may include letters and/or numbers, and in one instance, is a word or phrase. At step 612, suggested first alphanumeric strings are determined based on the user input. In one embodiment, determining suggested first alphanumeric strings includes taking the portion of the query that the user has entered and matching that portion to one or more alphanumeric strings located in the database or other storage device. For instance, if a user enters "fo," potential matches include "food," "football," "Ford," etc. A database or other storage device is accessed, and contains a plurality of alphanumeric strings that are each associated with at least one category based, in part, on a subject matter of each of the plurality of alphanumeric strings. A category, as used herein, describes a word or phrase that is representative of many other words, or that is used to encompass many other words or phrases. For instance, sports is a category that encompasses many words and phrases, such as football, soccer, basketball, golf, baseball, rugby, etc. Another example is an auto brand category that encompasses brand names such as Toyota, Ford, Chevrolet, Saturn, Mercury, Honda, Kia, or the like. The alphanumeric strings may be extracted from one or more of structured data or data logs. Further, the suggested first alphanumeric strings may be dynamically determined as the query is being entered by the user, and as such, may change as the user types more alphanumeric characters into a search box.

At step 614, the suggested first alphanumeric strings are communicated for display, such as to an end-user device for presentation to the user. At step 616, an indication of the first alphanumeric string is received. This indication may be a user selection of one of the suggested first alphanumeric strings presented to the user, or may be a user-entered indication. Here, the user may not select one of the suggested first alphanumeric strings but may continue entering (e.g., typing) a word or phrase until it is complete. At step 618, suggested queries are derived according to structured expressions. The suggested queries include the first alphanumeric string of the user-submitted query. Structured expressions comprise one or more categories and may be derived from a variety of sources. In one embodiment, structured expressions are manually entered into a system. In another embodiment, structured expressions are derived from a listing of popular queries, such as those determined at step 514 in FIG. 5. Patterns of these popular queries are analyzed to form structured expressions. For instance, if many queries are in the form of {<car-brand><car-model>}, then a structured expression having this form may be derived. As such, patterns of representative categories associated with alphanumeric strings within each of the queries are analyzed to determine structured expressions in this embodiment.

As discussed, alphanumeric strings are extracted from structured data, data logs, etc., and are associated with categories based, in part, on a subject matter of each string. Suggested queries are then formed by selecting one alphanumeric string from each of the categories included in the structured expression. For instance, if the first alphanumeric string is "football," and the structured expression is {<sport><college team>}, suggested queries may include "football Michigan," "football Kansas," "football Notre Dame," etc. The queries actually selected for suggestion to the user may be selected based on a number of factors, such as a group to which the user belongs, the popularity of one or more of the alphanumeric substrings in the query according to, for instance, data logs, or the like. At step 620, the suggested queries are communicated for display.

In one embodiment, the suggested queries are not contained in the data logs, and as such, may never have been issued as queries to a search engine before. These suggested queries represent new functionality of the search engine, and the new functionality is represented by the structured expressions. Further, the suggested queries do not necessarily have to be derived from the same structured expression. Two suggested queries may be "food recipes" and "food groups," as each may be from a different expression. Additionally, the query suggestions may be dynamically determined as the query is being entered by the user, and as such, the query suggestions may change as the user types more alphanumeric characters into a search box.

Figure 7:
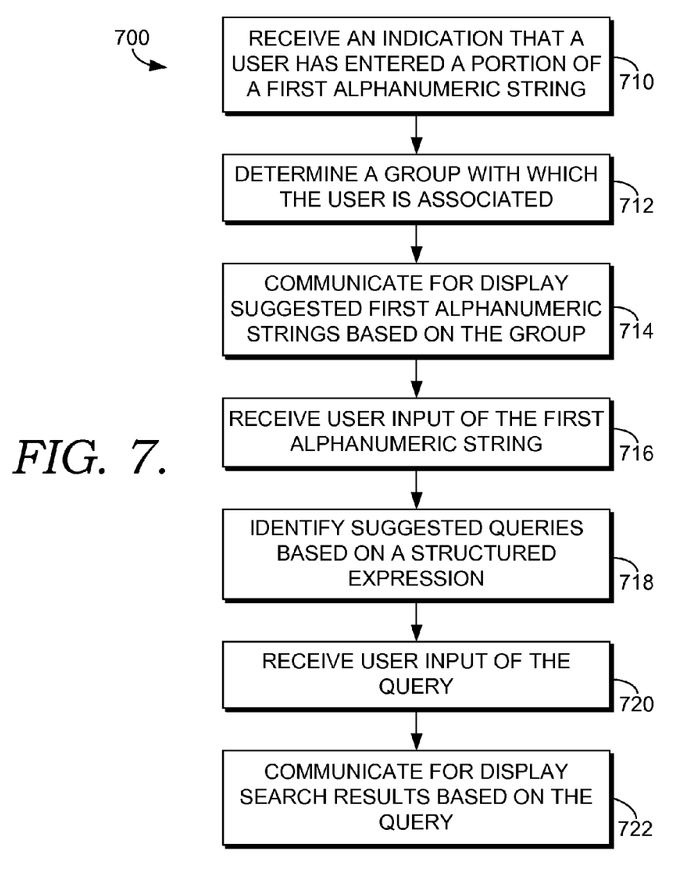

Turning to FIG. 7, a flow diagram of a method 700 is shown for determining suggested queries, in accordance with an embodiment of the present invention. At step 710, an indication is received that a user has entered a portion of a first alphanumeric string of a user-submitted query into a search box. At step 712, a group with which the user is associated is determined. In one embodiment, it is determined that the user is associated with the group by identifying the user in the data logs, typically by way of a user identification associated with the user. The user identification is not necessarily used to identify a user by name but may be used to distinguish one user from another. This alleviates privacy concerns. Based on various factors, the user is associated with the group(s). These factors may include, for example, queries that have previously been submitted by that user, as identified in the data logs, website links selected by the user, or preferences associated with the user. Further, potential queries are associated with various groups, including the group with which the user has been associated. The potential queries may be extracted from one or more data logs and are associated with the groups based on, in part, a subject matter of the one or more potential queries.

Suggested first alphanumeric strings are communicated for display at step 714 and are selected based on the group with which the user is associated, in addition to the at least the portion of the first alphanumeric string of the user-submitted query. Selecting the alphanumeric strings based on the group associated with the user allows for a more focused and relevant selection of alphanumeric strings. If randomly selected, there is a greater chance that those suggested alphanumeric strings will not be of any interest to the user, as they were not selected based on any user interest, such as a group associated with the user. User input is received at step 716, and indicates the first alphanumeric string of the user-submitted query. At step 718, suggested queries are identified based on a structured expression. A database or other storage device is accessed, which contains various alphanumeric strings that have been extracted from structured data, query logs, or the like. Each of the query suggestions contains the first alphanumeric string of the user-submitted query. The structured expressions have structures that have been determined by the structure of the potential queries in the data logs. In one embodiment, the structured expression comprises one or more categories that are each associated with a plurality of alphanumeric strings such that one of the alphanumeric strings is selected from each of the one or more categories to form a suggested query. In another embodiment, the structured expressions have been derived from popular queries extracted from data logs, such as those queries determined in relation to step 514 in FIG. 5.

At step 720, user input is received, which includes the user-submitted query. The user input, in one embodiment, is a user selection of one of the suggested queries presented to the user. At step 722, search results are determined and are communicated for display. The search results are identified based on the user-submitted query.

As can be understood, embodiments of the present invention provide X. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable storage media storing computer-useable instructions that, when used by one or more computing devices, cause the one or more computing devices to perform a method comprising:
    associating a user with at least one of a plurality of groups based on one or more of a subject matter of past queries submitted by the user or website links previously selected by the user;
    storing the association of the user with the at least one of the plurality of groups in a first database;
    receiving an indication that the user has entered at least a portion of a first alphanumeric string of a search query into a search box, the at least the portion of the first alphanumeric string of the search query associated with a first subject matter;
    identifying the user based on a user identification (ID) associated with the user;
    accessing the first database and using the user ID to determine the at least one of the plurality of groups with which the user is associated;
    accessing a second database comprising queries categorized into a plurality of groups based on a subject matter of each of the queries;
    identifying one or more queries in the second database that are categorized into a group of the plurality of groups that is the same as the at least one of the plurality of groups with which the user is associated, the identified one or more queries comprising one or more suggested queries, the one or more suggested queries associated with a second subject matter that is unrelated to the first subject matter of the at least the portion of the first alphanumeric string; and
    communicating for display the one or more suggested queries, wherein a quantity of the one or more suggested queries is less than a quantity of total queries for the group of the plurality of groups.

2. The one or more computer-readable storage media of claim 1, wherein the one or more suggested queries are communicated for display prior to the user entering the at least a portion of the first alphanumeric string.

3. The one or more computer-readable storage media of claim 1, wherein the one or more suggested queries are determined based on one or more of a popularity of each of the queries or how recently each of the queries was submitted to a search engine.

4. The one or more computer-readable storage media of claim 1, wherein at least a portion of a quantity of the one or more suggested queries is determined based on one or more of trends or topics associated with the at least one of the plurality of groups with which the user is associated.

5. The one or more computer-readable storage media of claim 1, wherein the queries in the second database are extracted from one or more data logs that include one or more of a web log, a query log, a toolbar log, or a browser log.

6. The one or more computer-readable storage media of claim 1, further comprising:
    receiving a user selection of one of the one or more suggested queries; and
    communicating for display one or more search results that are selected based on the one of the one or more suggested queries.

7. One or more computer-readable storage media storing computer-useable instructions that, when used by one or more computing devices, cause the one or more computing devices to perform a method comprising:

associating a user with at least one of a plurality of groups based on one or more of a subject matter of past queries submitted by the user or website links previously selected by the user;

storing the association of the user with the at least one of the plurality of groups in a first database;

receiving user input in a search box that includes at least a portion of a user-submitted query;

based on the user-submitted query, accessing a second database to determine one or more suggested alphanumeric strings, wherein the second database contains a plurality of alphanumeric strings that are each associated with at least one category based, in part, on a subject matter of each of the plurality of alphanumeric strings, and wherein the second database further contains one or more structured expressions each comprising a first category and at least a second category related to the first category;

communicating for display the one or more suggested alphanumeric strings;

receiving from the user a selection of a first alphanumeric string of the one or more suggested alphanumeric strings, the first alphanumeric string associated with a first category;

accessing the first database to determine the at least one of the plurality of groups with which the user is associated;

identifying a first structured expression in the second database that has a first category matching the first category associated with the first alphanumeric string and a second category that matches the at least one of the plurality of groups with which the user is associated;

using the second database, determining at least a second alphanumeric string associated with the second category of the first structured expression communicating for display the first alphanumeric string in association with the at least the second alphanumeric string as a first suggested query.

8. The one or more computer-readable storage media of claim 7, wherein the first structured expression is derived from a plurality of queries extracted from one or more data logs.

9. The one or more computer-readable storage media of claim 8, wherein the at least the second alphanumeric string is further determined based, in part, on a popularity of the at least the second alphanumeric string, wherein the popularity is determined based on a number of instances that the at least the second alphanumeric string is listed in the one or more data logs.

10. The one or more computer-readable storage media of claim 8, wherein patterns of representative categories associated with alphanumeric strings are analyzed to determine the structured expressions.

11. The one or more computer-readable storage media of claim 8, wherein the first suggested query is not contained in the one or more data logs.

12. The one or more computer-readable storage media of claim 7, wherein the first suggested query has never before been submitted as a query to a search engine.

13. The one or more computer-readable storage media of claim 7, wherein the first structured expression represents new functionality of a search engine.

14. One or more computer-readable storage media storing computer-useable instructions that, when used by one or more computing devices, cause the one or more computing devices to perform a method comprising:

associating a user with at least one of a plurality of groups based on one or more of a subject matter of past queries submitted by the user or website links previously selected by the user;

storing the association of the user with the at least one of the plurality of groups in a first database;

receiving an indication that the user has entered at least a portion of a search query into a search box;

accessing the first database to determine the at least one of the plurality of groups with which the user is associated;

accessing a second database comprising: 1) alphanumeric strings categorized into categories based on a subject matter of each of the alphanumeric strings, and 2) structured expressions comprising a first category and a second category related to the first category;

using the second database identifying a first alphanumeric string having a first category that matches the at least one of the plurality of groups with which the user is associated;

communicating for display as a suggested query at least the first alphanumeric string;

receiving user input selecting the first alphanumeric string;

accessing the second database to identify at least one structured expression having a first category that matches the first category of the first alphanumeric string and a second category related to the first category;

using the second database, identifying a second alphanumeric string associated with the second category of the at least one structured expression;

extracting the second alphanumeric string from the second database and combining the second alphanumeric string with the first alphanumeric string to generate a suggested query;

communicating for the display the suggested query;

receiving a selection of the suggested query; and communicating for display a plurality of search results that are identified based on the suggested query.

15. The one or more computer-readable storage media of claim 7, further comprising:

accessing the second database to identify a second structured expression comprising the first category and at least a third category related to the first category, wherein the third category matches the at least one of the plurality of groups with which the user is associated;

determining at least a third alphanumeric string associated with the third category of the second structured expression; and communicating for display the first alphanumeric string in association with the at least the third alphanumeric string as a second suggested query.

* * * * *